United States Patent [19]

MacIntyre

[11] 3,986,165
[45] Oct. 12, 1976

[54] CHOKE POSITION INDICATING DEVICE
[75] Inventor: Robert W. MacIntyre, Belmont, Mass.
[73] Assignee: The Raymond Lee Organization, Inc., New York, N.Y. ; a part interest
[22] Filed: Mar. 4, 1976
[21] Appl. No.: 663,794

[52] U.S. Cl. .............................. 340/52 D; 340/282; 200/61.44
[51] Int. Cl.² .......................................... B60Q 1/00
[58] Field of Search ............ 340/52 R, 52 D, 274 R, 340/282; 200/47, 61.44, 61.58 R, 61.64, 61.67, 61.7, 61.71, 61.72

[56] References Cited
UNITED STATES PATENTS
2,634,400  4/1953  Sweet ............................. 340/52 D
3,179,765  4/1965  Dyksterhouse ............... 200/61.58 R

*Primary Examiner*—Alvin H. Waring
*Attorney, Agent, or Firm*—Daniel Jay Tick

[57] ABSTRACT

A signal device pivotally mounted on the dashboard of a motor vehicle abuts the choke rod in a manner whereby when the choke rod is moved to close the choke it pivots the signal device away from the dashboard. A circuit includes electrical contacts and electrically connects a source of electrical energy and the contacts in circuit. The contacts cooperate to maintain the circuit open and the signal device inoperative when the knob of the choke rod is next-adjacent the dashboard and to close the circuit and actuate the signal device when the knob of the choke rod is moved away from the dashboard.

1 Claim, 6 Drawing Figures

CHOKE POSITION INDICATING DEVICE

BACKGROUND OF THE INVENTION

The present invention relates to a choke position indicating device. More particularly, the invention relates to a choke position indicating device for indicating the position of a choke rod having a free end and a knob thereon extending from a dashboard of a motor vehicle. The choke rod is axially movable from a position in which the knob thereof is next-adjacent the dashboard wherein the choke is open to a position in which the knob is spaced from the dashboard wherein the choke is closed.

Objects of the invention are to provide a choke position indicating device of simple structure, which is inexpensive in manufacture, installed with facility and convenience in new and existing motor vehicles, and functions efficiently, effectively and reliably to indicate the position of the choke of an automotive vehicle, and more specifically to indicate whether the choke is open or closed.

BRIEF DESCRIPTION OF THE DRAWINGS

In order that the invention may be readily carried into effect, it will now be described with reference to the accompanying drawing, wherein.

DETAILED DESCRIPTION OF THE INVENTION

Figure 1:
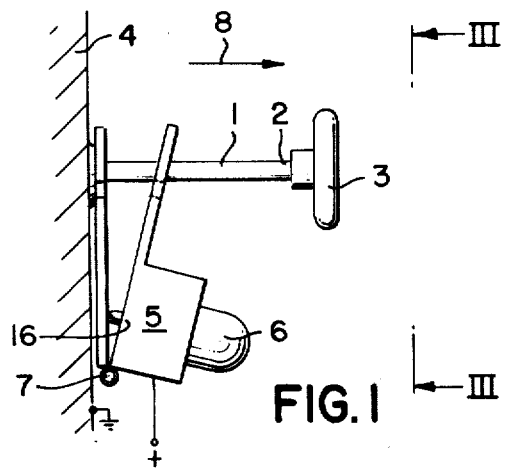
FIG. 1 is a side view of an embodiment of the choke position indicating device of the invention with the choke closed.
Figure 2:
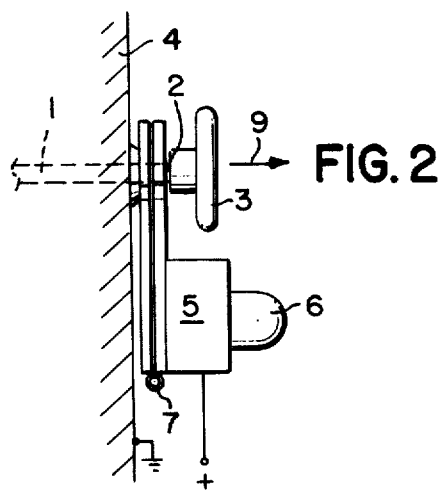
FIG. 2 is a side view of the embodiment of FIG. 1 with the choke open.

The choke position indicating device of the invention indicates the position of a choke rod 1 (FIGS. 1 and 2), having a free end 2 and a knob 3 thereon, extending from a dashboard 4 of a motor vehicle (FIGS. 1 and 2). The choke rod 1 is axially movable from a position, shown in FIG. 2, in which the knob 3 is substantially next-adjacent the dashboard 4 wherein the choke of the engine of the motor vehicle is open, to a position in which said knob is spaced from said dashboard, as shown in FIGS. 1 and 3, wherein said choke is closed.

Figure 3:
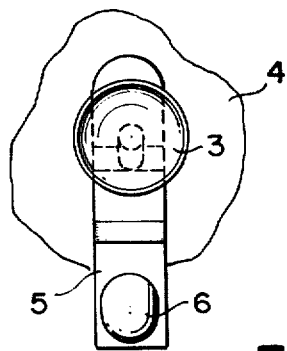
FIG. 3 is a view, taken along the lines III—III, of FIG. 1.
Figure 5:
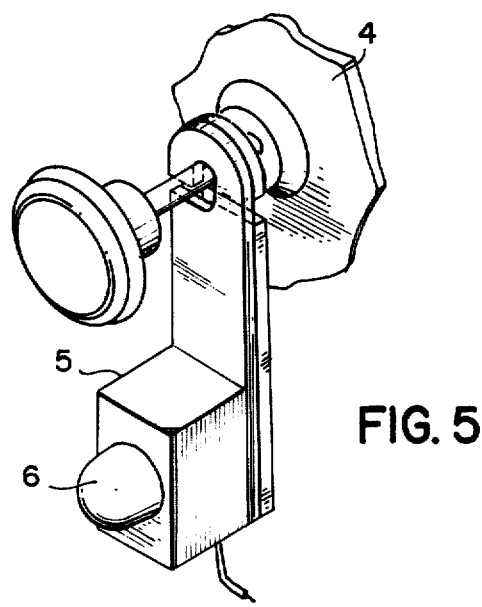
FIG. 5 is a perspective view of an embodiment of the choke position indicating device of the invention.

FIG. 5 shows the device of the invention, as shown in FIG. 2, with the knob 3 spaced from the dashboard 4, as shown in FIGS. 1 and 3.

The choke position indicating device of the invention comprises a signal device 5 having a signal lamp 6. The signal device 5 is pivotally mounted on the dashboard 4 by any suitable means, such as, for example, a hinge 7 (FIGS. 1 and 2), and abuts the choke rod 1 in a manner whereby when said choke rod is moved in the direction of an arrow 8 (FIG. 1) or an arrow 9 (FIG. 2), to close the choke, it pivots said signal device away from the dashboard, as shown in FIGS. 1 and 3.

Figure 6:
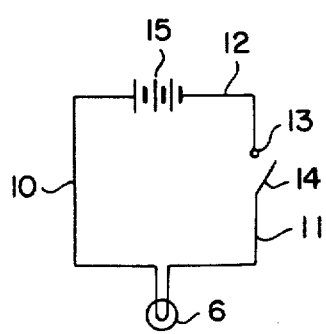
FIG. 6 is a circuit diagram of the choke position indicating device of the invention.

A circuit 10, 11, 12, shown in FIG. 6, includes electrical contacts 13 and 14 (FIG. 6) contained in the signal device 5 and electrically connects a source of electrical energy such as, for example, the battery 15 of the motor vehicle, and said contacts in circuit. The contacts 13 and 14 constitute a suitable arrangement and cooperate to maintain the circuit 10, 11, 12, 13, 14 open, so that the lamp 6 is extinguished when the knob 3 of the choke rod 1 is next-adjacent the dashboard 4, as shown in FIG. 2. The contacts 13 and 14 cooperate to close the circuit 10, 11, 12, 13, 14, thereby illuminating the lamp 6, when the knob 3 of the choke rod 1 is moved away from the dashboard 4, as shown in FIG. 1.

The signal device 5 is a type of limit switch and includes a limit switch activator button 16, as shown in FIG. 1. The limit switch 5 includes the contacts 13 and 14, as hereinbefore mentioned.

Figure 4:
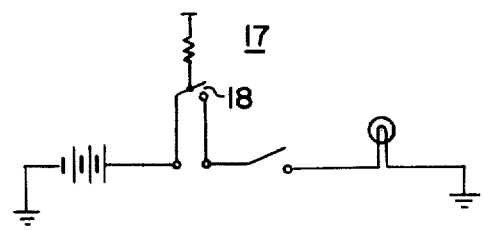
FIG. 4 is a circuit diagram of a thermal switch signal circuit.

The thermal switch signal circuit of FIG. 4 is an optional modification of the choke position indicating device of the invention. It comprises a commercially available heat-sensitive device 17 designed to activate a set of electrical contacts 18 to a closed, or contacting, position at a preselected temperature. The preselected temperature may be adjustable over a wide range.

The circuit of FIG. 4 functions to delay the illumination of the signal lamp 6 until the engine of the vehicle has warmed up sufficiently. The heat-sensitive device or thermal switch 17 is affixed to a suitable location in the engine compartment. The circuit of FIG. 4 thus eliminates the necessity for driving with an annoying light on until the choke could be opened, and also serves as a reminder to open the choke when the lamp is illuminated.

While the invention has been described by means of a specific example and in a specific embodiment, I do not wish to be limited thereto, for obvious modifications will occur to those skilled in the art without departing from the spirit and scope of the invention.

I claim:

1. A choke position indicating device for indicating the position of a choke rod having a free end and a knob thereon extending from a dashboard of a motor vehicle, the choke rod being axially movable from a position in which the knob thereof is substantially next-adjacent the dashboard wherein the choke is open to a position in which said knob is spaced from the dashboard wherein the choke is closed, said choke position indicating device comprising a signal device pivotally mounted on the dashboard and abutting the choke rod in a manner whereby when said choke rod is moved to close the choke it pivots the signal device away from the dashboard;

a source of electrical energy; and circuit means including electrical contact means and electrically connecting the source of electrical energy and the contact means in circuit, said contact means cooperating to maintain the circuit open and the signal device inoperative when the knob of the choke rod is next-adjacent the dashboard and to close the circuit and actuate the signal device when the knob of the choke rod is moved away from the dashboard.

* * * * *